US010928286B2

(12) United States Patent
Pelot et al.

(10) Patent No.: US 10,928,286 B2
(45) Date of Patent: Feb. 23, 2021

(54) SYSTEM AND METHOD FOR EVALUATING JOINT COMPOUND SPECIMEN (71) Applicant: United States Gypsum Company, Chicago, IL (US)

(72) Inventors: David D. Pelot, Chicago, IL (US); Richard B. Stevens, Village of Lakewood, IL (US)

(73) Assignee: United States Gypsum Company, Chicago, IL (US)

( * ) Notice: Subject to any disclaimer, the term of this patent is extended or adjusted under 35 U.S.C. 154(b) by 297 days.

(21) Appl. No.: 15/052,389

(22) Filed: Feb. 24, 2016

(65) Prior Publication Data

US 2017/0241881 A1 Aug. 24, 2017

(51) Int. Cl.
*G01N 3/56* (2006.01)

(52) U.S. Cl.
CPC ....... *G01N 3/56* (2013.01); *G01N 2203/0676* (2013.01)

(58) Field of Classification Search
CPC .......... G01B 5/0002; G01B 5/30; G01B 5/28; G01B 5/06; G01N 3/56; G01N 2203/0676
See application file for complete search history.

(56) References Cited

U.S. PATENT DOCUMENTS

| | | | |
|---|---|---|---|
| 2,582,223 A | | 1/1952 | Blackburn et al. |
| 3,908,316 A | * | 9/1975 | Retteu .................... B24B 21/04 451/300 |
| 3,924,362 A | * | 12/1975 | McAleer .............. B24D 13/147 264/45.1 |
| 5,746,822 A | | 5/1998 | Espinoza et al. |
| 5,932,019 A | | 8/1999 | Espinoza et al. |

(Continued)

FOREIGN PATENT DOCUMENTS

| | | | |
|---|---|---|---|
| CN | 202462239 U | * | 10/2012 |
| CN | 102226751 B | | 11/2012 |

(Continued)

OTHER PUBLICATIONS

University of Rochester, "Chapter 7. Work and Kinetic Energy", Lecture Notes for Physics (2008): pp. 1-14 (http://teacher.pas.rochester.edu/phy121/LectureNotes/Chapter07/Chapter7.html).*

*Primary Examiner* — Michele Fan
(74) *Attorney, Agent, or Firm* — Leydig, Voit & Mayer, Ltd.; Philip T. Petti; Pradip K. Sahu (57) ABSTRACT Embodiments of a system and a method for evaluating a joint compound specimen can be used to determine a numerical sandability value for the specimen. A moving assembly is configured to move a sanding member in a sanding direction relative to the joint compound specimen supported in a support fixture. An actuator assembly is configured to drive the sanding member into contacting relationship with the joint compound specimen such that the sanding member exerts a controlled amount of pressure against the joint compound specimen. The force gauge is configured to measure a resistance force against the sanding member in a resistance direction in opposing relationship to the sanding direction. A processor programmed with a joint compound analyzing application is configured to use a force signal from the force gauge that is indicative of the resistance force to determine the sandability value for the joint compound specimen.

9 Claims, 5 Drawing Sheets

(56) References Cited

U.S. PATENT DOCUMENTS

| | | |
|---|---|---|
| 6,228,163 B1 | 5/2001 | Espinoza et al. |
| 6,379,458 B1 | 4/2002 | Immordino et al. |
| 6,419,573 B1 * | 7/2002 | Lise ................ B24D 3/002 |
| | | 15/118 |
| 6,673,144 B2 | 1/2004 | Immordino, Jr. et al. |
| 6,740,395 B2 | 5/2004 | Halm et al. |
| 7,013,705 B2 | 3/2006 | Wortmann et al. |
| 7,293,448 B2 | 11/2007 | Treece et al. |
| 7,364,015 B2 | 4/2008 | Englert et al. |
| 7,851,057 B2 | 12/2010 | Englert et al. |
| 8,057,915 B2 | 11/2011 | Song et al. |
| 8,234,912 B2 | 8/2012 | Suarez-Rivera et al. |
| 8,329,785 B2 | 12/2012 | Langford |
| 8,434,377 B2 | 5/2013 | Lin et al. |
| 8,642,346 B2 | 2/2014 | Immordino, Jr. et al. |
| 8,668,087 B2 | 3/2014 | Hargrove et al. |
| 8,822,566 B2 | 9/2014 | Hargrove et al. |
| 8,969,472 B2 | 3/2015 | Stewart et al. |
| 9,115,027 B2 | 8/2015 | Ayambem et al. |
| 9,328,023 B2 | 5/2016 | Rosenthal et al. |
| 9,376,824 B2 | 6/2016 | Neill et al. |
| 2003/0066456 A1 * | 4/2003 | Langford ................ C04B 24/36 |
| | | 106/244 |
| 2003/0075048 A1 * | 4/2003 | Jordan, Sr. ............. B01D 45/10 |
| | | 95/285 |
| 2010/0170328 A1 * | 7/2010 | Lin ........................ G01N 3/567 |
| | | 73/81 |
| 2010/0300176 A1 | 12/2010 | Zhang |
| 2016/0001411 A1 * | 1/2016 | Alberti ................... B25B 23/14 |
| | | 700/188 |
| 2016/0236444 A1 | 8/2016 | Immordino et al. |

FOREIGN PATENT DOCUMENTS

| | | |
|---|---|---|
| CN | 102169072 B | 3/2013 |
| CN | 103308409 A * | 9/2013 |

* cited by examiner

SYSTEM AND METHOD FOR EVALUATING JOINT COMPOUND SPECIMEN

BACKGROUND

The present disclosure relates to evaluating a joint compound specimen and, more particularly, to a system and method for evaluating a sanding characteristic of a joint compound specimen.

Interior walls of commercial and residential buildings are often constructed using gypsum wallboard panels, commonly referred to as "wallboard" or "drywall." During construction of the walls, wallboard panels are secure to a support structure (e.g., a wooden or metal frame) using screws, nails or other fasteners. As the wall is constructed, gaps (typically referred to as "joints") are formed between the adjacent wallboard panels. In order to achieve a united, visually-appealing surface, the joints between the drywall panels and any cracks, screw and/or nail holes, and other surface imperfections are concealed using a specially-prepared adhesive referred to as "joint compound."

There are different types of joint compounds known in the art, including setting-type and drying-type joint compounds, which is available in a ready-mix form. Drying-type joint compound cures through the evaporation of water, whereas setting-type joint compound chemically reacts with water during the curing process. Setting-type joint compounds typically use calcium sulfate hemihydrate, also known as stucco, and other additives in joint compound powder form. When water is added to such setting-type joint compound powder, it reacts with the calcium sulfate hemihydrate via a hydration reaction to form an interlocking matrix of calcium sulfate dihydrate crystals. The interlocking crystal matrix gives the compound increased strength. A third type of joint compound combines the setting action of a calcium sulfate hemihydrate based compound with the ease of use of a ready mixed compound. While such compound compositions are referred to as "joint compound" throughout this disclosure, it will be appreciated that the term "joint compound" is not limiting in nature and refers generally to any composition—including, but not limited to, wallboard joint compound compositions, spackling compositions, wood fillers, and plasters—that can be used to finish the joints and/or conceal the joints between wallboard panels or be used to conceal or repair any cracks or imperfections in a wall.

For taping joints, an operator typically places a layer of joint compound over the joint formed by the abutted edges of the wallboards, and embeds a paper or fiberglass reinforcing joint tape within that joint compound. After the applied joint compound has hardened, a second layer of joint compound is applied over the joint tape to completely fill the joint and provide a smooth surface. Multiple layers of joint compound can be applied in order to obtain a smooth, finished wall. Each layer of joint compound is allowed to dry (or set) prior to application of the next layer. Paint or a wall covering, such as wallpaper, can then be applied over the joint compound and drywall panels, so that the finished wall present a uniform appearance.

Between coats of joint compound, and before the wall is finished, the joint compound is sanded to remove irregularities in the wall surface and/or ready the assembly for a subsequent application of more joint compound. The ease of sanding (or sandability of) the hardened joint compound can be a factor that is considered when the consumer is making a purchasing decision. Conventionally, the sandability of joint compound has been measured in a subjective manner. As a result, it can be difficult for manufacturers of joint compound to convey to joint compound suppliers and to customers the degree of sandability the joint compound has.

Furthermore, sanding the joint compound generates very fine particles and much of it tends to remain airborne, settling out only after long periods of time. The amount of dust generated during sanding is another factor that can be considered by a customer when deciding which joint compound to purchase.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a system for evaluating a joint compound specimen. In one embodiment, the evaluation system includes a support fixture, a sanding member, a moving assembly, an actuator assembly, a force gauge, and a processor.

The support fixture is configured to support the joint compound specimen. The sanding member includes a sanding surface that comprises an abrasive material. The moving assembly is configured to move the sanding surface of the sanding member in a sanding direction along a sanding axis relative to the joint compound specimen supported in the support fixture.

The actuator assembly is connected to the sanding member. The actuator assembly is configured to push the sanding surface of the sanding member into contacting relationship with the joint compound specimen supported in the support fixture such that the sanding surface exerts a controlled amount of pressure against the joint compound specimen.

The force gauge is associated with the sanding member. The force gauge is configured to measure a resistance force against the sanding member along the sanding axis in a resistance direction. The resistance direction is in opposing relationship to the sanding direction. The force gauge is configured to generate a force signal indicative of the resistance force.

The processor is in communication with the force gauge to receive the force signal therefrom. The processor is programmed with a joint compound analyzing application stored on a non-transitory computer readable medium. The joint compound analyzing application is configured to use the force signal to determine a sandability value for the joint compound specimen.

In another aspect of the present disclosure, embodiments of a method of evaluating a joint compound specimen are described. In one embodiment, a method of evaluating a joint compound specimen includes sanding the joint compound specimen with a sanding surface of a sanding member by moving the sanding surface of the sanding member relative to the joint compound specimen in a sanding direction along a sanding axis.

A controlled amount of force is applied to the joint compound specimen through the sanding member as the sanding surface of the sanding member sands the joint compound specimen. A joint compound parameter relating to sanding the joint compound specimen is measured.

Further and alternative aspects and features of the disclosed principles will be appreciated from the following detailed description and the accompanying drawings. As will be appreciated, the systems and techniques for evaluating a joint compound specimen disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF EXEMPLARY EMBODIMENTS

The present disclosure provides various embodiments of a system and a method for evaluating a joint compound specimen. Embodiments of a system and a method for evaluating a joint compound specimen following principles of the present disclosure can be used to effectively determine an objective sandability value for the joint compound specimen using the system to measure the amount of work expended in removing a given thickness of a layer of joint compound from the joint compound specimen.

Embodiments of a system and a method for evaluating a joint compound specimen following principles of the present disclosure can be used to produce a numerical value that quantifies the sandability of various joint compound specimens. In embodiments, the numerical sandability value generated using principles of the present disclosure can be used to differentiate between joint compound specimens beyond subjective assessments made by a human operator using the sense of touch/feel. This quantitative measuring technique provides a scale which represents the ease of sanding which has otherwise been measured subjectively and has shown inconsistent results. Using sandability data obtained using techniques according to principles of the present disclosure, an operator can identify which joint compound specimen is more difficult to sand and the amount of difficulty in sanding between the two joint compound specimens.

Embodiments of a system and a method for evaluating a joint compound specimen following principles of the present disclosure can exert a repeatable sanding force and motion to different joint compound specimens to enhance the ability to compare joint compound parameter data from the different joint compound specimens. An embodiment of a system of evaluating a joint compound specimen according to principles of the present disclosure can generate repeatable and consistent sanding pressure over different specimen trials.

Embodiments of a system and a method for evaluating a joint compound specimen following principles of the present disclosure can be used to measure respirable airborne dust levels. Using principles of the present disclosure, a sanding protocol using a consistent, repeatable sanding motion and pressure can be used to evaluate different joint compound specimens to provide more accurate comparisons between joint compound airborne dust levels generated by the respective specimens. Such evaluations can be helpful to assess the effectiveness of an additive in the joint compound formulation to reduce airborne dust movement and/or duration.

Figure 1:
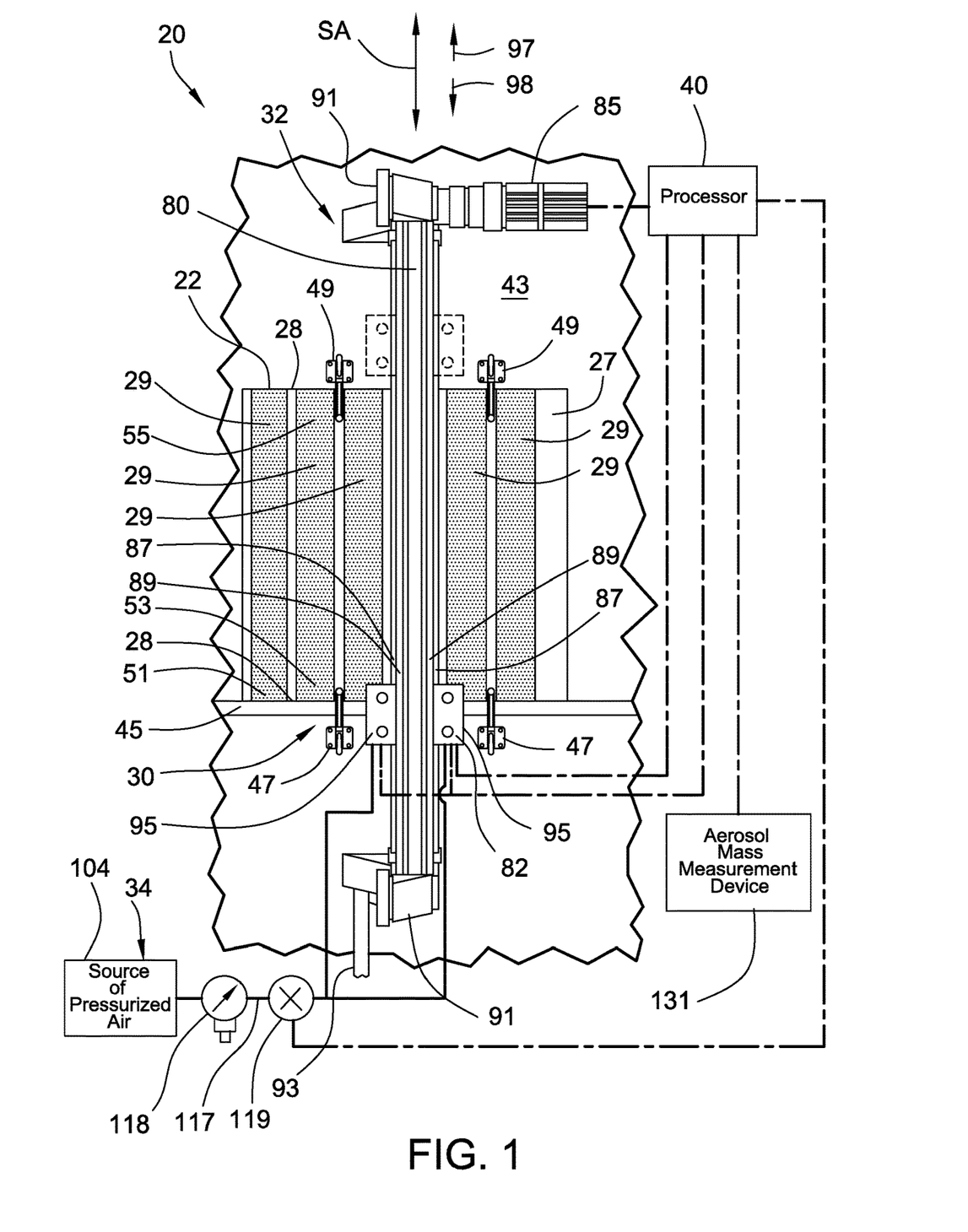
FIG. 1 is a front elevational schematic view of an embodiment of a system for evaluating a joint compound specimen constructed in accordance with principles of the present disclosure.
Figure 2:
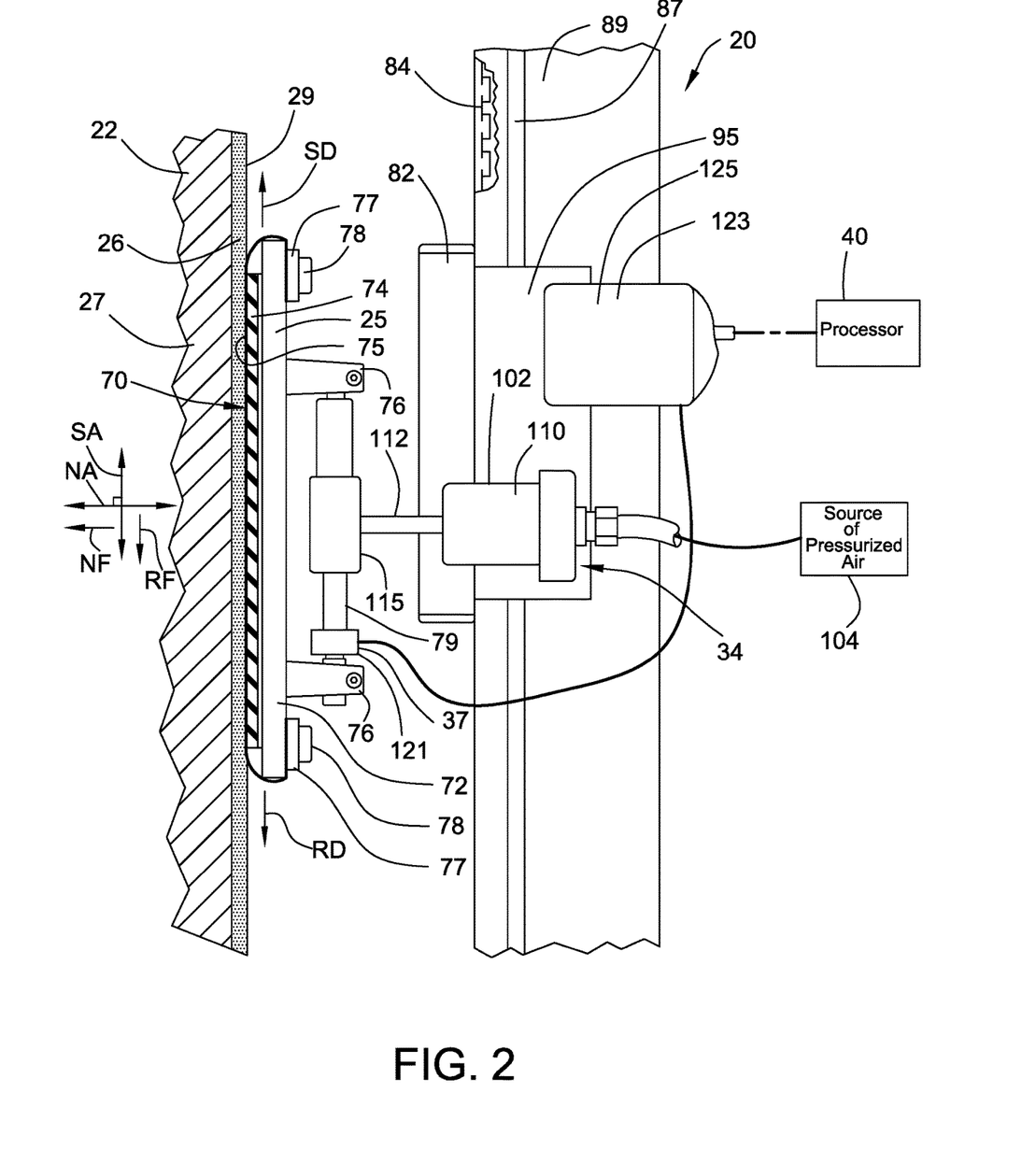
FIG. 2 is a side elevational schematic view of the evaluation system of FIG. 1.

Turning now to the Figures, an embodiment of a system 20 for evaluating a joint compound specimen constructed according to principles of the present disclosure is shown in FIGS. 1 and 2. Referring to FIG. 2, the evaluation system 20 is configured to sand a joint compound specimen 22 with a sanding member 25 (see FIG. 2) that delivers a substantially repeatable sanding pressure and that moves over a substantially repeatable sanding path. The evaluation system 20 is configured to measure the resistance force (RF) exerted against the sanding member 25 in a direction opposing the movement of the sanding member 25 in a sanding direction SD as it moves along a sanding axis SA over the sanding path while sanding the joint compound specimen 22 at a given normal force (NF). The evaluation system 20 is configured to use the resistance force (RF) measured over the sanding path to calculate the amount of work (W) exerted against the sanding member 25 in removing a removal thickness (RT) of a layer 26 of joint compound from the joint compound specimen 22 (see FIG. 4 also). In embodiments, the evaluation system 20 is configured to determine a sandability value for the joint compound specimen 22 that is correlated to the amount of work per unit thickness (W/RT).

In embodiments, the joint compound specimen 22 can be any suitable size and/or shape. For example, in the illustrated embodiment, the joint compound specimen 22 can include a gypsum wallboard 27 that has a rectangular shape. In embodiments, the gypsum wallboard 27 has a nominal four foot width and a suitable length, such as a length in a range between two feet and four feet, for example. In the illustrated embodiment, the length of the gypsum wallboard extends horizontally as shown in FIG. 1. In embodiments, the gypsum wallboard 27 can include edges 28 along its length that are tapered. In embodiments, the gypsum wallboard can have at least one face that is substantially planar.

In embodiments, the joint compound specimen 22 can include a plurality of strips 29 of joint compound that extend from edge 28 to edge 28 of the gypsum wallboard 27. For example, in embodiments, the joint compound specimen 22 can include six strips 29 of joint compound applied to the gypsum wallboard where the strips 29 are four inches wide (along the horizontal axis in FIG. 1) and spaced about one inch apart from each other along their width. In other embodiments, the joint compound specimen 22 can include a different number of strips 29 of joint compound, such as, eight strips 29, for example.

In embodiments, each strip 29 of joint compound can be applied such that it has a substantially uniform thickness relative to the other strips 29 of the joint compound specimen 22 and along its length (between the tapered edges in such embodiments where the strips 29 are applied to a tapered edge face). In embodiments, the strips 29 of joint compound can be applied using any suitable technique, as will be appreciated by one skilled in the art. For example, in embodiments, a pair of screeds can be placed upon the gypsum wallboard in spaced relationship to each other. The screeds can have substantially the same thickness and be configured to be spaced a uniform distance apart from each other. The space defined between the screeds can be filled with joint compound such that a strip of joint compound layer is applied thereto. The screeds can be used to form each such strip so that each strip 29 of joint compound of the joint compound specimen 22 (and each strip of joint compound on different joint compound specimens) has substantially the same size and thickness.

In the embodiment illustrated in FIGS. 1 and 2, the evaluation system 20 includes a support fixture 30, the sanding member 25 (FIG. 2), a moving assembly 32, an actuator assembly 34, a force gauge 37 (see FIG. 2), and a processor 40. The support fixture 30 is configured to support the joint compound specimen 22. The sanding member 25 is configured to sand one of the strips 29 of joint compound of the joint compound specimen 22 supported by the support fixture 30. The moving assembly 32 is configured to reciprocally move the sanding member 25 over a range of travel along a sanding axis SA between a first position (as shown in FIG. 1), or lower position, and a second position (such as is shown in broken lines in FIG. 1), or upper position. The actuator assembly 34 is configured to drive the sanding member 25 into contacting relationship with an aligned strip 29 of joint compound of the joint compound specimen 22 supported in the support fixture 30 such that the sanding member 25 exerts a controlled amount of pressure against the layer 26 of joint compound.

The moving assembly 32 and the actuator assembly 34 cooperate together to reciprocally move the sanding member 25 such that the sanding member 25 sands the joint compound specimen 22 over a sanding path. In the illustrated embodiments, the moving assembly 32 and the actuator assembly 34 cooperate together to allow the sanding member 25 to perform a first sanding stroke as the sanding member 25 moves in an upward sanding direction 97 from the first position to the second position and a second sanding stroke as the sanding member 25 moves in a downward sanding direction 98 from the second position back to the first position. In embodiments, the processor 40 can be used to control the moving assembly 32 and the actuator assembly 34 to perform any of a variety of sanding paths that can include one or more sanding strokes in one or both directions and that can include a sanding stroke of variable length.

Referring to FIG. 2, the force gauge 37 is configured to measure a resistance force (RF) exerted against the sanding member 25 in a direction opposing the motion of the sanding member 25 as it sands the joint compound specimen 22 with a given normal force (NF). The processor 40 is programmed to determine a sandability value for the joint compound specimen 22 using the force measurement data generated by the force gauge 37.

The support fixture 30 of the embodiment illustrated in FIG. 1 includes a wall portion 43, a support rail 45, and a plurality of clamps 47, 49. The support rail 45 is mounted to the wall portion 43 and is configured to support the joint compound specimen 22 in an upright position against the wall portion 43. The clamps 47, 49 are configured to selectively retain the joint compound specimen 22 in place upon the support rail 45.

In embodiments, the wall portion 43 can comprise a portion of any suitable vertically-extending wall system. For example, in embodiments, the wall portion 43 comprises an interior wall of a lab. In embodiments, the wall portion 43 can comprise a separate, free-standing wall structure disposed, for example, in a room within which the evaluation system 20 is positioned.

In the illustrated embodiment, the support rail 45 is configured to support a lower edge 51 of the joint compound specimen 22. The support rail 45 of the illustrated embodiment is in the form of a cleat that is secured to the wall portion 43. In the illustrated embodiment, the support rail 45 extends along a substantially horizontal axis.

The clamps 47, 49 are configured to selectively retain the joint compound specimen 22 in the upright position. In embodiments, the support fixture 30 can include any suitable clamp. In the illustrated embodiment, each clamp 47, 49 is in the form of a toggle clamp that is mounted to the wall portion 43. The clamps 47, 49 are arranged such that a first pair of clamps 47 is configured to selectively clamp a lower portion 53 of the joint compound specimen 22, and a second pair of clamps 49 is configured to selectively clamp an upper portion 55 of the joint compound specimen 22 when it is supported on the support rail 45.

In other embodiments, the support fixture 30 can have a different arrangement, as will be appreciated by one skilled in the art. For example, in embodiments, the support rail 45 can have a different shape and/or orientation, and the clamps can have a different form.

In embodiments, the support rail 45 can be associated with an indexing system configured to help position the joint compound specimen 22 relative to the sanding member 25. In use, the indexing system can be used to position the joint compound specimen 22 on the support rail 45 at a predetermined location and allow the joint compound specimen 22 to be sequentially re-positioned such that the relative location of the specimen and the sanding member 25 respectively changes in a standardized increment. Such an arrangement can facilitate the evaluation of a joint compound specimen having multiple strips 29 of joint compound applied thereto, as shown in FIG. 1.

Referring to FIG. 2, in embodiments, the sanding member 25 includes a sanding surface 70 that comprises an abrasive material. The sanding surface 70 is configured to abradingly remove hardened joint compound from the joint compound specimen 22. In embodiments, the sanding surface 70 of the sanding member 25 can be made from any suitable abrading material and can have any suitable grit size. For example, in embodiments, the sanding surface 70 can be made from a material that is rated as 150 grit using the United States CAMI (Coated Abrasive Manufacturers Institute) designation system.

In the illustrated embodiment, the sanding member 25 includes a sanding body 72, a sanding pad 74, and a flexible sheet 75. The sanding pad 74 is connected to the sanding body 72, and the flexible sheet 75 can be connected to at least one of the sanding body 72 and the sanding pad 74.

The sanding body 72 is connected to the actuator assembly 34. Projecting from the sanding body 72 is a pair of mounting ears 76 in spaced relationship to each other. A mounting rod 79 extends between the mounting ears 76. The mounting rod is connected to the actuator assembly 34 via a push bar 115 secured to the mounting rod at an intermediate point thereof. The push bar 115, the mounting rod 79, and the mounting ears 76 are all rigidly connected together, which connection can be accomplished using any suitable techniques, as will be appreciated by one skilled in the art. In other embodiments, the mounting arrangement between the sanding member 25 and the actuator assembly 34 can be different.

In the illustrated embodiment, the sanding body 72 comprises a sanding block that is made from aluminum. In other embodiments, the sanding body 72 can be made from another suitable material. The sanding body 72 has a generally rectangular, block shape.

The sanding pad 74 is connected to the sanding body 72. The sanding pad 74 can be connected to the sanding body 72 using any suitable technique, such as by using an adhesive, for example. The sanding pad 74 can be made from a material that not as hard as the sanding body 72. In embodiments, the sanding pad 74 can be made from a resiliently flexible material, such as foam or rubber, for example.

The flexible sheet 75 includes the sanding surface 70. The flexible sheet 75 is connected to the sanding body 72 such that the sanding pad 74 is in underlying relationship with the sanding surface 70.

In embodiments, any suitable technique can be used to removably mount the flexible sheet 75 to the sanding body 72 and/or pad. In the illustrated embodiment, a pair of clamping plates 77 is removably mounted to the sanding body 72 via a respective threaded fastener 78. The clamping plates 77 are configured to secure ends of the flexible sheet 75 between a respective one of the clamping plates 77 and the sanding body 72. In other embodiments, a different technique can be used to removably mount the flexible sheet 75. For example, in embodiments, the flexible sheet 75 and the sanding pad 74 can include a hook-and-loop fastener system to secure the flexible sheet 75 to the sanding body 72 via the sanding pad 74.

In embodiments, the flexible sheet 75 can be replaced after a predetermined number of uses of the evaluation system 20 or if inspection reveals excessive wear of the sanding surface 70. In some embodiments, a sanding protocol includes mounting a new flexible sheet 75 to the sanding body 72 for each evaluation of a joint compound specimen.

Referring to FIG. 1, in embodiments, the moving assembly 32 is configured to move the sanding surface 70 of the sanding member 25 in each sanding direction 97, 98 along the sanding axis SA relative to the joint compound specimen 22 supported in the support fixture 30. In embodiments, the moving assembly 32 is in electrical communication with the processor 40 such that the processor 40 can be used to control the movement of the sanding member 25 via the moving assembly 32. In embodiments, the processor 40 can be programmed such that the moving assembly 32 moves the sanding member 25 over at least one predetermined sanding path.

In embodiments, the sanding path can include at least one sanding stroke. In yet other embodiments, the sanding path can include a variable amount of sanding strokes that is based upon removing a predetermined removal thickness from a layer 27 of joint compound from the joint compound specimen 22.

In the illustrated embodiment of FIG. 1, the moving assembly 32 includes a guide rail 80, a carriage 82, a drive mechanism 84 (see FIG. 2), and a motor 85. The guide rail 80 extends along the sanding axis SA. The carriage 82 is movably mounted to the guide rail 80 such that the carriage 82 is reciprocally movable along the sanding axis SA relative to the guide rail 80.

The guide rail 80 of the illustrated embodiment is in the form of an extruded, u-shaped channel. A pair of mounting ribs 87 extends respectively from a pair of sidewall 89 of the u-shaped guide rail 80. The mounting ribs 87 are configured to matingly engage the carriage 82 such that the carriage 82 is mounted to the guide rail 80 and can translate along the guide rail 80. The mounting ribs 87 extend substantially over the length of the guide rail 80 along the sanding axis SA. The drive mechanism 84 is housed within the sidewalls 89 of the u-shaped guide rail 80 (see FIG. 2, as well).

In the illustrated embodiment, each end of the guide rail 80 is mounted to the wall via a mounting bracket 91. Also, a support member 93 can extend between the guide rail 80 and a floor surface to further support the guide rail 80 in a fixed position. In other embodiments, any suitable mounting/supporting technique can be used to secure the guide rail 80 in a fixed position.

The carriage 82 of the illustrated embodiment is generally u-shaped and has a pair of sidewalls 95 configured to retentively engage, respectively, the mounting ribs 87 of the guide rail 80 in a conventional manner such that the carriage 82 is reciprocally movable along the mounting ribs 87 relative to the guide rail 80. The carriage 82 is configured to move the sanding member 25 with respect to the support fixture 30 such that the sanding member 25 is reciprocally movable with respect to the joint compound specimen 22 supported by the support fixture 30 along the sanding axis SA. The carriage 82 is reciprocally movable relative to the guide rail 80 along the sanding axis SA over a range of travel sufficient to carry out a range of sanding paths and sanding strokes for a variety of different-sized joint compound specimens, such as between the first position (as shown in FIG. 1) and the second position (as shown in broken lines in FIG. 1), for example.

In embodiments, the carriage 82 and the sanding member 25 are connected together such that movement of the carriage 82 correspondingly moves the sanding member 25. In the illustrated embodiment, the body of the 72 of the sanding member 25 is connected to the carriage 82 via the actuator assembly 34 by way of the push bar 115.

The carriage 82 is positioned on the guide rail 80 such that the interior cavities defined by each u-shape of the components are in facing relationship to each other. The drive mechanism 84 is disposed within this enclosed area. The drive mechanism 84 extends between, and is engaged with, the carriage 82 and the motor 85.

The motor 85 is configured to selectively move the carriage 82 along the sanding axis SA relative to the guide rail 80 via the drive mechanism 84. In the illustrated embodiment, the drive mechanism 84 is in the form of an endless drive belt, and the motor 85 is in the form of a servomotor. The drive mechanism 84 is interengaged with the motor 85 and the carriage 82 such that operation of the motor 85 in a first direction causes the drive mechanism 84 to move the carriage 82 in a first direction 97 (upward along the sanding axis SA in the illustrated embodiment), and operation of the motor 85 in a second direction 98 (in opposing relationship to the first direction) causes the drive mechanism 84 to move the carriage 82 in a second direction (downward along the sanding axis SA in the illustrated embodiment) in opposing relationship to the first direction.

With such an arrangement, the processor 40 can be used to control the moving assembly 32 to selectively reciprocally move the sanding member 25 via movement of the carriage 82 relative to the guide rail 80 and the joint compound specimen 22 supported by the support fixture 30. The sanding member 25 can be moved in both the first direction 97 and the second direction 98 by the moving assembly 32 such that the sanding member 25 sands the joint compound specimen 22 as it moves in each direction.

In embodiments, any suitable drive mechanism 84 and motor 85 can be used. In other embodiments, the drive mechanism 84 can have a different form, such as a screw or a rack and pinion arrangement, for example. In other embodiments, any suitable motor 85 can be used.

In embodiments, the actuator assembly 34 is configured to push the sanding surface 70 of the sanding member 25 into contacting relationship with the joint compound specimen 22 supported in the support fixture 30 such that the sanding surface 70 exerts a controlled amount of pressure against the joint compound specimen 22. In embodiments, the actuator assembly 34 includes a linear actuator 102 (see FIG. 2) and a linear actuator power source 104. The linear actuator 102 can be configured to controllably act upon the sanding member 25 such that the sanding surface 70 exerts a controlled amount of pressure against the joint compound specimen 22.

The linear actuator power source 104 can be configured to selectively operate the linear actuator 102 such that the linear actuator 102 drives the sanding member 25 to exert a controlled force along a normal axis NA. In the illustrated embodiment, the normal axis NA is substantially perpendicular to the sanding axis SA.

In embodiments, the actuator assembly 34 is connected to the sanding member 25 and to the moving assembly 32. The actuator assembly 34 of the illustrated embodiment of FIGS. 1 and 2, includes a pair of linear actuators 102. In the illustrated embodiment, the linear actuators 102 are respectively mounted to the sidewalls 89 of the carriage 82 of the moving assembly 32 and are both mounted to the sanding member 25 of the sanding body 72. One of the linear actuators 102 is shown in FIG. 2. The other linear actuator 102 and sidewall 89 of the carriage can have a similar construction and mounting relationship. The linear actuator power source 104 can be selectively controlled to operate the linear actuators 102.

The linear actuators 102 of the illustrated embodiment are in the form of pneumatic cylinders. Each cylinder 102 includes a body 110 and a piston rod 112. The piston rod 112 is reciprocally movable over a range of travel relative to the cylinder body 110 between a retracted position and an extended position.

The body 110 of each cylinder is mounted to a respective one of the sidewalls 95 of the carriage 82. The piston rod 112 of each cylinder is mounted to the push bar 115 of the sanding body 72. The cylinders 102 selectively provide the pressure, or normal force (NF), exerted by the sanding member 25 against the joint compound specimen 22. In the illustrated embodiment, the linear actuators 102 act along a normal axis NA that is substantially perpendicular to the sanding axis SA.

The linear actuator power source 104 of the illustrated embodiment is in the form of a supply of pressurized air. In embodiments, the pneumatic line system 117 connecting the supply of pressurized air 104 and the cylinders 102 can be sufficiently sized and flexible to accommodate the movement of the carriage 82 along the sanding axis SA.

The supply of pressurized air 104 can be selectively controlled to operate the linear actuators 102 such that each piston rod 112 is selectively driven toward the extended position to exert a controlled pressure upon the sanding body 72 through the push bar 115. The sanding body 72 in turn transmits the pressure exerted against it by the piston rods 112 to the sanding surface 70 of the sanding member 25. In embodiments, a suitable pressure regulator 118 can be supplied to allow the pressure delivered to the cylinders 102 to be controlled, which correspondingly controls the pressure exerted by the cylinders upon the sanding member 25 (and in turn the force that the sanding member 25 exerts upon the joint compound specimen 22).

In embodiments, a pressure sensor 119 can be interposed between the supply of pressurized air 104 and the cylinders 102 to provide an indication of the pressure of the pressurized air selectively powering the cylinders 102. In embodiments, the pressure sensor 119 can be in communication with the processor 40 and can be configured to send the processor 40 a pressure signal indicative of the pressure sensed by the pressure sensor. The processor 40 can be programmed to regulate the pressure of the pressurized air 104 such that the air pressure delivered to the cylinders 102 is within a tolerance range of a target pressure.

In embodiments, a suitable valve system can be provided to allow for the selective delivery of pressurized air to the cylinders 102 to transmit pressure to the sanding member 25 via the action of the piston rods 112. The processor 40 can be programmed to control the actuator assembly 34 to regulate the pressure of the pressurized air delivered to the cylinders 102.

The pressure of the pressurized air 104 can be controlled to correspondingly control the amount of force NF exerted by the sanding surface 70 of the sanding member 25 via the cylinders 102. By controlling the pressure of the pressurized air delivered to the cylinders 102, the amount of pressure the piston rods 112 exert upon the body 70 of the sanding member 25 is controlled, which in turn controls the amount of force the sanding surface 70 exerts upon the joint compound specimen 22.

In other embodiments, the actuator assembly 34 can include any suitable linear actuator 102 and power source 104. For example, in embodiments, the actuator assembly 34 can include a linear actuator in the form of hydraulically-operated cylinder and a source of pressurized hydraulic fluid. In other embodiments, the linear actuator can be in the form of a mechanical actuator (such as a suitable drive screw, for example).

Referring to FIG. 2, the force gauge 37 is associated with the sanding member 25. The force gauge 37 is configured to measure a resistance force (RF) exerted against the sanding member 25 when it is sanding the joint compound specimen 22 with the application of a controlled force (NF) along a normal axis NA by the actuator assembly 34 through the sanding member 25. The force gauge 37 is configured to measure the resistance force (RF) against the sanding member 25 along the sanding axis SA in a resistance direction RD which is in opposing relationship to the sanding direction SD. In embodiments, the sanding direction SD (and correspondingly, the resistance direction RD) can reciprocally change as the sanding member 25 reciprocally moves in either direction 97, 98 between the first position and the second position (as shown in FIG. 1). The force gauge 37 can be positioned parallel with the stroke motion of the sanding member 25 along the sanding axis SA such that, as the carriage 82 moves in one direction, the resistance force RF or pull exerted upon the sanding member 25 is measured by the force gauge 37.

The force gauge 37 is configured to generate a force signal indicative of the resistance force. The force gauge 37 is in communication with the processor 40 such that the force gauge 37 can transmit the force signal to the processor 40.

In embodiments, the force gauge 37 can include a strain gauge 121 that deforms in response to a force being applied thereto, thereby changing the electrical resistance through the strain gauge 121. In the illustrated embodiment, the strain gauge 121 is mounted to the mounting rod 79 of the sanding body 72. A load cell 123 of the force gauge 37 can be used to convert the change in resistance through the strain gauge 121 into an electrical force signal indicative of the force sensed by the force gauge 37 through the strain gauge 121. In the illustrated embodiment the load cell 123 is housed within a transmitter unit 125 of the force gauge which is mounted to one of the sidewalls 95 of the carriage 82. The transmitter unit 125 can be configured to transmit to send the force signal to the processor 40.

In embodiments, any suitable force gauge 37 can be used. For example, in embodiments, the force gauge 37 can comprise a wireless force gauge 37. The force gauge 37 can be configured to wirelessly transmit the force signal to the processor 40.

The processor 40 can be in communication with the moving assembly 32, the actuator assembly 34, and the force gauge 37. In embodiments, the processor 40 is programmed with a joint compound analyzing application stored on a non-transitory computer readable medium. In embodiments, the joint compound analyzing application can be used to program the processor 40 to operate the evaluation system 20 and to conduct various joint compound specimen analyzing protocols.

In embodiments, the joint compound analyzing application can include a control module configured to control the operation of the evaluation system 20. For example, in embodiments, the processor 40 can be programmed to control the moving assembly 32 to direct the sanding member 25 over a predetermined sanding path. In embodiments, the processor 40 can be programmed to control the actuator assembly 34 such that the actuator assembly 34 acts upon the sanding member 25 to apply a controlled amount of force to the joint compound specimen 22 while the sanding member 25 sands the joint compound specimen 22.

In embodiments, the joint compound analyzing application can include a sandability module configured to determine a numerical sandability value for a joint compound specimen 22 based upon a sanding protocol. In embodiments, the processor 40 is in communication with the force gauge 37 to receive the force signal therefrom. The joint compound analyzing application is configured to use the force signal received from the force gauge 37, which is indicative of the resistance force (RF) measured over the travel of the sanding member 25, to determine a sandability value for the joint compound specimen 22.

In embodiments, the processor 40 can comprise any suitable computing device, such as, a microprocessor, a mainframe computer, a digital signal processor, a portable computing device, a personal organizer, a device controller, or a computational engine within an appliance. In embodiments, the processor 40 can comprise a collection of computing devices. In embodiments, the processor 40 can comprise a personal computer as is widely available for home and business use. In embodiments, the processor 40 includes one or more input devices (e.g., a keyboard and a mouse) and a display device (e.g., a monitor). In embodiments, the processor 40 includes a data storage device configured to store joint compound specimen data for use by the joint compound analyzing application and/or generated by the joint compound analyzing application.

In embodiments, the joint compound analyzing application can be stored upon any suitable computer-readable storage medium. For example, in embodiments, a joint compound analyzing application following principles of the present disclosure can be stored upon a hard drive, floppy disk, CD-ROM drive, tape drive, zip drive, flash drive, optical storage device, magnetic storage device, and the like.

In embodiments, the joint compound analyzing application includes a graphical user interface that can be displayed by the display device. The graphical user interface can be used to facilitate the inputting of commands and data by a user to the joint compound analyzing application and to display outputs generated by the joint compound analyzing application.

Figure 3:
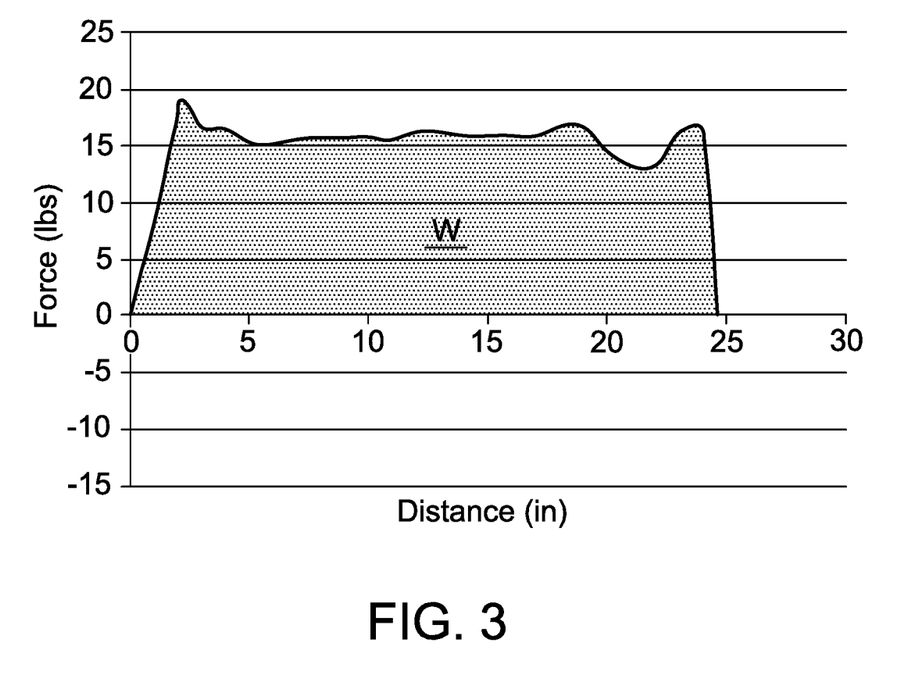
FIG. 3 is an exemplary graph of resistance force over distance measured by the evaluation system of FIG. 1 as a sanding member of the evaluation system sands a joint compound specimen.
Figure 4:
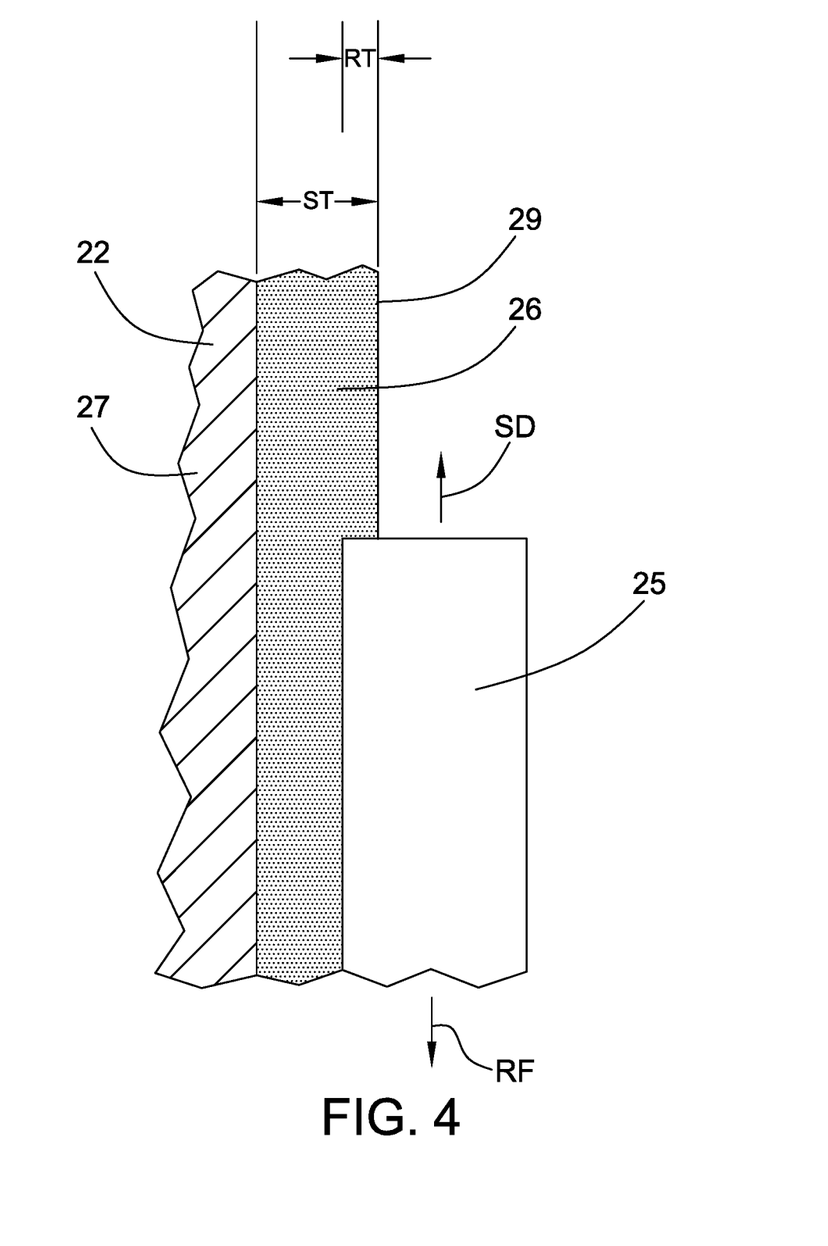
FIG. 4 is an enlarged, fragmentary schematic view of the joint compound specimen and the sanding member, illustrating the sanding member removing a removal thickness of a layer of joint compound of the joint compound specimen.

Referring to FIGS. 3 and 4, in embodiments, the sandability module of the joint compound analyzing application calculates the sandability value based upon an amount of work (W) performed (see FIG. 3) to remove a removal thickness (RT) from a specimen thickness (ST) of a layer of joint compound of the joint compound specimen 22 (see FIG. 4) by dividing the amount of work (W) by the removal thickness (RT). Referring to FIG. 3, the amount of work (W) performed to remove the removal thickness (RT) can be calculated as the area under a graph of the resistance force measured by the force gauge 37 over the sanding path of the sanding member 25. For example, the amount of work (W) for a sanding stroke of twenty-four inches as shown in FIG. 3 is the area defined by the measured resistance force over the sanding stroke. In embodiments, the processor 40 can be programmed to receive resistance force measurements from the force gauge 37 substantially continuously over the entire sanding stroke and to correlate the resistance force measurement data to a location of the sanding member 25 along the sanding path. In embodiments, the joint compound analyzing application can be configured to calculate the amount of work for the sanding path by integrating the resistance force over the distance of the sanding stroke.

Referring to FIG. 4, the joint compound specimen 22 includes a strip or layer 29 of joint compound having a specimen thickness (ST). In embodiments, the amount of material removed by the sanding member 25 after it has completed a sanding path can be determined by any suitable technique. For example, in embodiments, a depth gauge or dial caliper can be used to determine the removal thickness (RT) of the material removed by the sanding member 25 during a sanding operation. In other embodiments, a laser measuring device can be configured to measure the removal thickness (RT). In embodiments, the specimen thickness (ST) and removal thickness (RT) data can be communicated to the processor 40 using any suitable technique, such as, by an operator using a graphical user interface and/or a keyboard, for example.

In embodiments, the joint compound analyzing application can be configured to determine the sandability value by calculating an amount of work performed to remove a unit of thickness from the specimen thickness by dividing the amount of work (W) by the removal thickness (RT). In embodiments, the joint compound analyzing application calculates the sandability value based upon a formula comprising:

$$\frac{SW}{RT} \tag{Eq. 1}$$

where SW is the sanding work calculated based upon the resistance force measured by the force gauge 37 over a sanding path of a given distance traversed by the sanding member 25 over a layer of joint compound, and RT is a value of a removal thickness of joint compound removed from the layer of joint compound of the joint compound specimen 22 as a result of the sanding member 25 sanding the layer of joint compound over the sanding path, where the removal thickness is measured along an axis perpendicular to the sanding axis SA.

In embodiments, the joint compound analyzing application can be configured to determine the sandability value by calculating an amount of work performed over a sanding path traversed by the sanding member 25 using the following equation:

$$SW = \int RF \times dx \qquad (Eq.\ 2)$$

where SW is the sanding work,
RF is the resistance force measured by the force gauge 37 over the sanding path of a given distance traversed by the sanding member 25 over a layer of joint compound, and
dx is the distance of the sanding path. Such a formula can be used to calculate the bounded area W in FIG. 3. In embodiments where the sanding path includes multiple sanding strokes, the sanding work value can comprise the aggregated sum of the work exerted for all strokes of the sanding path.

In embodiments, the joint compound analyzing application can be configured to calculate the amount of work performed to remove a specified unit of thickness. For example, in embodiments, the joint compound analyzing application can be configured to express the removal thickness RT in mils (1/1000 of an inch). The joint compound analyzing application can be configured to calculate the work exerted per mil in sanding the joint compound specimen 22 to remove the removal thickness RT.

In embodiments, the joint compound analyzing application can be configured to generate a count of the number of strokes the sanding member 25 takes in a given sanding path and to calculate the sanding work SW for each stroke. In embodiments, the joint compound analyzing application can be configured to calculate an average sanding work value for all of the strokes in a given sanding path.

Referring to FIG. 1, in the illustrated embodiment, the evaluation system 20 also includes an aerosol mass measurement device 131 configured to measure a quantity of airborne joint compound particulate from the joint compound specimen 22 supported by the support fixture 30 generated during at least one sanding stroke of the sanding member 25. In the illustrated embodiment, the aerosol mass measurement device 131 is in communication with the processor 40.

In embodiments, the joint compound analyzing application can include a dust control module configured to use dust measurement data from the aerosol mass measurement device to generate a numerical dust control value. The processor 40 can be programmed with the dust control module to receive dust particle measurement data from the aerosol mass measurement device and calculate a dust control value for the joint compound specimen 22 after performing a standardized dust control measurement protocol.

The aerosol mass measurement device can be any suitable equipment configured to measure the amount of airborne dust particles. For example, in embodiments, the aerosol mass measurement device can be in the form of a laser photometer configured to provide real-time aerosol mass readings that can be converted to a time-weighted average quantity using a dust control measurement protocol.

In embodiments, a joint compound analyzing application following principles of the present disclosure can be configured to implement an embodiment of a joint compound testing protocol according to principles of the present disclosure. In embodiments, the joint compound analyzing application can include other modules and features that are configured to carry out one or more features of an embodiment of a method of evaluating a joint compound specimen following principles of the present disclosure, as will be appreciated by one skilled in the art.

Embodiments of a method of evaluating a joint compound specimen can be carried out using a system of evaluating a joint compound specimen following principles of the present disclosure. For example, referring to FIG. 5, steps of an embodiment of a method 500 of evaluating a joint compound specimen following principles of the present disclosure are shown.

Figure 5:
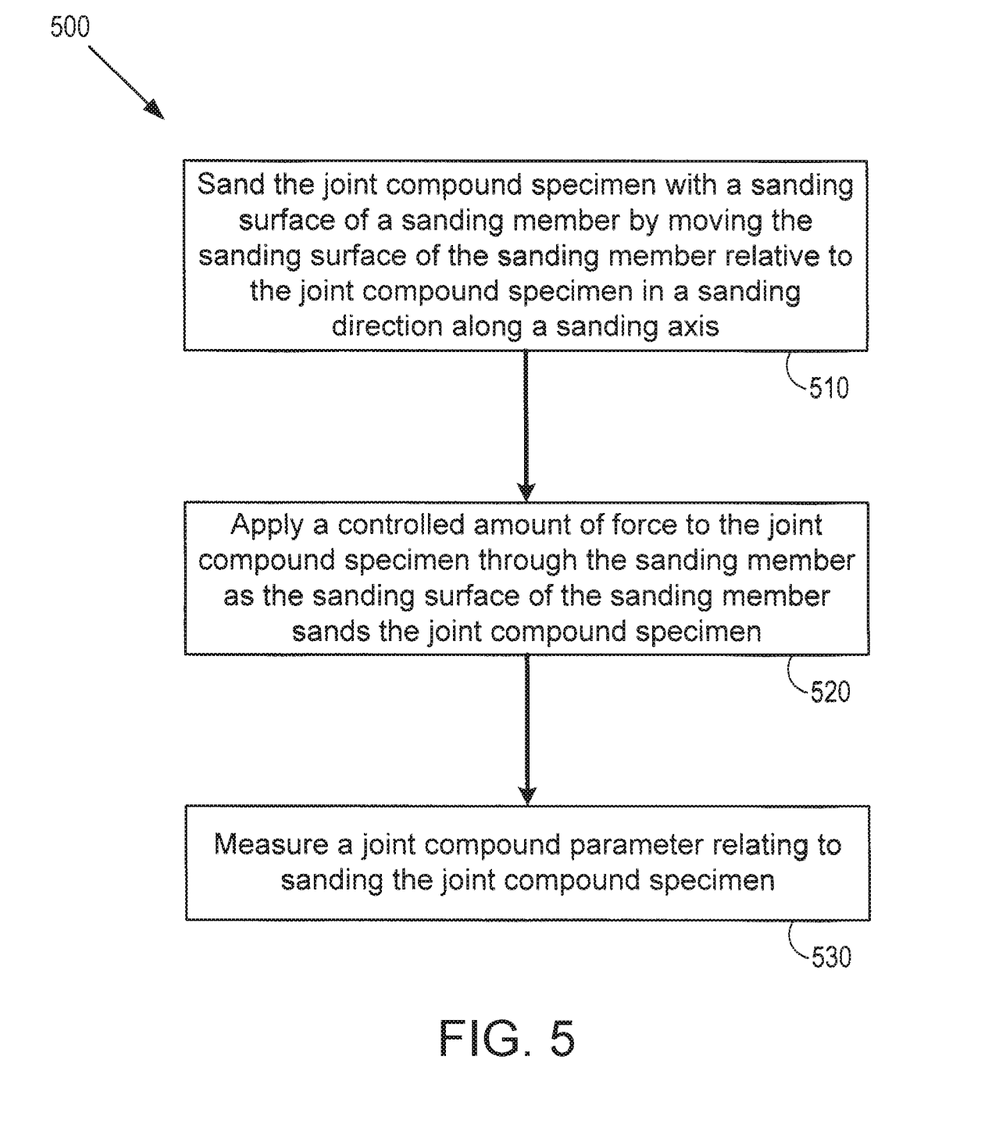
FIG. 5 is a flowchart illustrating steps of an embodiment of a method of evaluating a joint compound specimen following principles of the present disclosure.

The joint compound specimen is sanded with a sanding surface of a sanding member by moving the sanding surface of the sanding member relative to the joint compound specimen in a sanding direction along a sanding axis (step 510). In embodiments of a method following principles of the present disclosure, the sanding member is mounted to a carriage 82. Sanding the joint compound specimen can include moving the carriage 82 relative to the joint compound specimen along the sanding axis. In embodiments, the sanding member is moved over a predetermined sanding path according to a standardized test protocol.

A controlled amount of force is applied to the joint compound specimen through the sanding member as the sanding surface of the sanding member sands the joint compound specimen (step 520). In embodiments, the force acts along a normal axis which is substantially perpendicular to the sanding axis. In embodiments of a method following principles of the present disclosure, applying the controlled amount of normal force to the joint compound specimen through the sanding member includes controlling a sanding pressure applied to the sanding member via a linear actuator such that the controlled amount of normal force is within a force tolerance range of a target force value.

A joint compound parameter relating to sanding the joint compound specimen is measured (step 530). In embodiments, the joint compound parameter can be any suitable parameter, as will be appreciated by one skilled in the art. For example, in embodiments, the joint compound parameter includes the resistance force exerted against the sanding member as it sands the joint compound specimen. In embodiments, the joint compound parameter includes a removal thickness which constitutes the thickness of the amount of joint compound removed from a layer of joint compound of the joint compound specimen by sanding the layer of joint compound with the sanding member applying a controlled force thereto.

In embodiments of a method following principles of the present disclosure, measuring the joint compound parameter comprises measuring a resistance force against the sanding member along the sanding axis in a resistance direction in response to applying the controlled amount of normal force to the joint compound specimen through the sanding member as the sanding surface of the sanding member sands the joint compound specimen. The resistance direction is in opposing relationship to the sanding direction.

In embodiments, measuring the resistance force includes using a force gauge mounted to the sanding member. In embodiments, the force gauge generates a force signal that is correlated to the resistance force it sense over the sanding path traveled by the sanding member. In embodiments, the force gauge wirelessly communicates the force signal to the processor.

In embodiments of a method following principles of the present disclosure, the method 500 can also include determining a sandability value of the joint compound specimen using a processor to execute a joint compound analyzing application stored on a non-transitory computer readable medium. The joint compound analyzing application uses the measured resistance force to determine the sandability value. In embodiments, the sandability value comprises a numerical value within a numerical scale that is correlated to the ease of sanding the joint compound specimen.

In embodiments of a method following principles of the present disclosure, the joint compound specimen comprises a layer of joint compound having a specimen thickness. Sanding the joint compound specimen includes moving the sanding member over at least one sanding stroke. Measuring the joint compound parameter includes determining a removal thickness removed from the specimen thickness by sanding the joint compound specimen over the at least one sanding stoke. The sandability value can be determined by calculating an amount of work performed to remove a unit of thickness from the specimen thickness by dividing the amount of work by the removal thickness. The amount of work can be calculated using the measured resistance force over a distance traveled by the sanding member over the at least one sanding stroke.

In embodiments of a method following principles of the present disclosure, the joint compound specimen comprises a layer of joint compound having a specimen thickness, wherein moving the sanding surface of the sanding member relative to the joint compound specimen includes moving the sanding member over at least one sanding stroke, and wherein measuring the joint compound parameter comprises determining a number of sanding strokes the sanding surface of the sanding member makes over an area of the layer of joint compound to sand through the specimen thickness in the area.

In embodiments of a method following principles of the present disclosure, the joint compound specimen comprises a layer of joint compound having a specimen thickness. In embodiments, sanding the joint compound specimen includes moving the sanding member over at least one sanding stroke. In embodiments, measuring the joint compound parameter comprises determining a sanding removal thickness by calculating an average sanding removal thickness removed from the specimen thickness for a number of sanding removal thicknesses removed in a series of sanding strokes.

In embodiments of a method following principles of the present disclosure, measuring the joint compound parameter comprises measuring airborne dust generated from the joint compound specimen. In embodiments, airborne dust is measured using a time-weighted average quantity using a dust measurement protocol. In embodiments, the dust measurement protocol includes using a system of evaluating a joint compound specimen according to principles of the present disclosure to apply a controlled amount of force to the joint compound specimen through the sanding member as its sanding surface sands the joint compound specimen over a predetermined sanding path.

By analyzing the resistance force data from the force gauge generated using a standardized sanding path upon one joint compound specimen and comparing the resistance force data from other joint compound specimens using the same experimental parameters, the ease of sanding of the joint compound specimen can be quantitatively measured and compared to other joint compound specimens. A system constructed according to principles of the present disclosure can provide repeatable sanding force and motion to a series of different joint compound specimens. This repeatable sanding motion can permit an accurate measure of the amount of normal force and the number of strokes to sand through a specific thickness, namely to determine the "burn through" (the amount of strokes necessary to sand off the entire thickness of compound) for a given layer of joint compound of a joint compound specimen.

The repeatable sanding motion can also help when measuring respirable airborne dust levels. The consistent sanding motion and force application possible with embodiments of a system constructed according to principles of the present disclosure can provide more accurate comparisons between compound airborne dust levels. Furthermore, such testing protocols and data can help assess the effectiveness of the presence and/or the concentration of an additive (relative to am control specimen) for reducing airborne dust movement.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for evaluating a joint compound specimen, the system comprising:
   a support fixture, the support fixture configured to support the joint compound specimen;
   a sanding member, the sanding member including a sanding surface, the sanding surface comprising an abrasive material;

a moving assembly, the moving assembly configured to move the sanding surface of the sanding member in a sanding direction along a sanding axis relative to the joint compound specimen supported in the support fixture, wherein the moving assembly includes a guide rail, a carriage, a drive mechanism, and a motor, the guide rail extending along the sanding axis, the carriage movably mounted to the guide rail such that the carriage is reciprocally movable along the sanding axis relative to the guide rail, the drive mechanism extending between, and being engaged with, the carriage and the motor, and the motor being configured to selectively move the carriage along the sanding axis relative to the guide rail via the drive mechanism;

an actuator assembly, the actuator assembly connected to the sanding member, the actuator assembly configured to drive the sanding surface of the sanding member into contacting relationship with the joint compound specimen supported in the support fixture such that the sanding surface exerts a controlled amount of pressure against the joint compound specimen;

a force gauge, the force gauge associated with the sanding member, the force gauge configured to measure a resistance force against the sanding member along the sanding axis in a resistance direction, the resistance direction being in opposing relationship to the sanding direction, the force gauge configured to generate a force signal indicative of the resistance force;

a processor, the processor in communication with the force gauge to receive the force signal therefrom, the processor programmed with a joint compound analyzing application stored on a non-transitory computer readable medium, the joint compound analyzing application being configured to use the force signal to determine a sandability value for the joint compound specimen based upon a formula comprising:

$$\frac{SW}{RT}$$

where SW is the sanding work calculated based upon the resistance force measured by the force gauge over a sanding path of a given distance traversed by the sanding member, and RT is a value of a thickness amount of joint compound removed from the joint compound specimen over the sanding path, the thickness amount being measured along an axis perpendicular to the sanding axis.

2. The system for evaluating according to claim 1, wherein the support fixture includes a support rail, a clamp, and a wall portion, the support rail mounted to the wall portion and configured to support the joint compound specimen in an upright position against the wall portion, the clamp configured to selectively retain the joint compound specimen in the upright position.

3. The system for evaluating according to claim 1, wherein the sanding member includes a sanding body, a sanding pad, and a flexible sheet, the sanding body connected to the actuator assembly, the sanding pad connected to the sanding body, the flexible sheet including the sanding surface, and the flexible sheet connected to the sanding body such that the sanding pad is in underlying relationship with the sanding surface.

4. The system for evaluating according to claim 1, wherein the actuator assembly includes a linear actuator and a linear actuator power source, the linear actuator being mounted to the carriage and to the sanding member, the linear actuator power source being configured to selectively operate the linear actuator such that the linear actuator drives the sanding member to exert a normal force along a normal axis.

5. The system for evaluating according to claim 4, wherein the normal axis is substantially perpendicular to the sanding axis.

6. The system for evaluating according to claim 4, wherein the sanding member includes a sanding body and a flexible sheet, the flexible sheet including the sanding surface, the flexible sheet connected to the sanding body such that the sanding surface is in overlying relationship with the sanding pad, and the linear actuator being connected to the sanding body.

7. The system for evaluating according to claim 1, further comprising:

an aerosol mass measurement device configured to measure a quantity of airborne joint compound particulate from the joint compound specimen supported by the support fixture generated during at least one sanding stroke of the sanding member.

8. The system for evaluating according to claim 1, wherein the actuator assembly includes a linear actuator and a linear actuator power source, the linear actuator operably arranged with the sanding member, the linear actuator power source being configured to selectively operate the linear actuator such that the linear actuator drives the sanding member to exert a normal force along a normal axis applying the controlled amount of normal force to the joint compound specimen through the sanding member such that the controlled amount of normal force is within a force tolerance range of a target force value.

9. The system for evaluating according to claim 1, wherein the sandability value comprises a numerical value within a numerical scale correlated to the ease of sanding the joint compound specimen.

* * * * *